United States Patent
Rosenberg

(10) Patent No.: US 9,368,019 B1
(45) Date of Patent: Jun. 14, 2016

(54) METHOD FOR NOTIFYING ONE OR MORE INDIVIDUALS ABOUT THE PRESENCE OF ONE OR MORE OCCUPANTS IN A VEHICLE

(71) Applicant: Tamir Rosenberg, Stevenson Ranch, CA (US)

(72) Inventor: Tamir Rosenberg, Stevenson Ranch, CA (US)

( * ) Notice: Subject to any disclaimer, the term of this patent is extended or adjusted under 35 U.S.C. 154(b) by 23 days.

(21) Appl. No.: 14/600,385

(22) Filed: Jan. 20, 2015

Related U.S. Application Data

(60) Provisional application No. 62/096,870, filed on Dec. 25, 2014.

(51) Int. Cl.
| | |
|---|---|
| G08B 21/22 | (2006.01) |
| G08B 21/02 | (2006.01) |
| B60R 21/015 | (2006.01) |
| H04M 3/24 | (2006.01) |
| H04W 4/12 | (2009.01) |

(52) U.S. Cl.
CPC ............ G08B 21/22 (2013.01); G08B 21/0269 (2013.01); *B60R 21/015* (2013.01); *H04M 3/24* (2013.01); *H04W 4/12* (2013.01)

(58) Field of Classification Search
CPC .......... G08B 21/22; H04M 3/24; H04W 4/12; B60R 21/015
See application file for complete search history.

(56) References Cited

U.S. PATENT DOCUMENTS

| | | | | |
|---|---|---|---|---|
| 8,884,718 B2* | 11/2014 | Sinoussi | ................ | H03L 1/022 331/117 R |
| 2011/0281519 A1* | 11/2011 | Reuss | ................... | H04W 8/005 455/41.2 |
| 2012/0040650 A1* | 2/2012 | Rosen | ................ | H04M 3/2218 455/414.1 |
| 2012/0105637 A1* | 5/2012 | Yousefi | .................. | H04N 7/183 348/148 |
| 2012/0173900 A1* | 7/2012 | Diab | ....................... | H04L 12/10 713/310 |
| 2015/0237661 A1* | 8/2015 | Farrell | ................ | H04W 76/021 455/41.2 |
| 2016/0066013 A1* | 3/2016 | Li | .................... | H04N 21/41422 725/75 |

* cited by examiner

*Primary Examiner* — Van Trieu

(57) ABSTRACT

In one embodiment, the present invention is a mobile application that, after being installed and activated on a mobile device, detects whether there are network signals. After the invention detects network signals, the mobile application asks the user whether or not there is an occupant in the vehicle. If the user responds that there are one or more occupants in the vehicle, the invention starts checking for interruption of the network signals. When the network signals are no longer available, the invention sends a notification to the user requesting him/her to respond to the notification. If the user does not respond to the notification, the invention sends alerts to a preprogrammed list of several people and/or emergency services. The alerts may include the location information of the vehicle.

6 Claims, 4 Drawing Sheets

METHOD FOR NOTIFYING ONE OR MORE INDIVIDUALS ABOUT THE PRESENCE OF ONE OR MORE OCCUPANTS IN A VEHICLE

CROSS-REFERENCE TO RELATED APPLICATIONS

This patent application claims the benefit of provisional patent application 62/096,870, filed on Dec. 25, 2014 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to the field of mobile applications for detection of unattended occupants within a vehicle.

There are many patented inventions for notifying individuals responsible for an occupant that the occupant is left in a vehicle. For example, U.S. Pat. No. 6,922,147 by Viksnins, et al. provides for a warning system sensing child left behind in infant seat in vehicle. U.S. Pat. No. 8,618,926 by Thompson provides for a warning system to avoid child hyperthermia in vehicles. U.S. Pat. No. 6,930,614 by Rackham, et al. provides for an occupant alarm system. WO 2012109472 by Gregory B Schoenberg and Robert S. Steffen provides for systems and methods for indicating the presence of a child in a vehicle. U.S. Pat. No. 8,212,665 by Shoenberg provides for systems and methods for indicating the presence of a child in a vehicle. U.S. Pat. No. 7,592,905 by Barton, et al. provides for an apparatus and method to detect the presence of a child in a vehicle.

Most of these devices use sensors in order to detect whether an occupant is in the vehicle. Such sensors will sense the occupant only if the occupant is in a vehicle where the sensors are located. Consequently, the devices using sensors lack flexibility. There is a pressing social need for an invention that can operate in most vehicles without the need for installing sensors in the vehicle. Moreover, there is a demand for an invention that does not require the users of the invention to buy (often expensive) sensors. The present invention fills the aforementioned gaps in the prior art.

Relevant prior art includes:
U.S. Pat. No. 6,922,147 by Viksnins
U.S. Pat. No. 8,618,926 by Thompson
U.S. Pat. No. 6,930,614 by Rackham
WO 2012109472 by Gregory B Schoenberg and Robert S. Steffen
U.S. Pat. No. 8,212,665 by Shoenberg
U.S. Pat. No. 7,592,905 by Barton

SUMMARY OF THE INVENTION

The present invention is a method for notifying one or more individuals about the presence of one or more occupants in a vehicle. The notified individuals may include, but are not limited to, parents, guardians of disabled persons, and animal caretakers. The occupants may include, but are not limited to, children, disabled persons, and animals.

In one embodiment of the invention, the invention is a mobile application that, after being installed and activated on a mobile device, detects whether there are network signals. The network signals can be emitted, for example, by Bluetooth and/or WiFi devices built-in in the vehicle and/or an additional Bluetooth and/or an additional WiFi device. After the invention detects network signals, the mobile application asks the user whether or not there is an occupant in the vehicle. When the network signals are no longer available, the mobile application sends a notification to the user requesting him/her to respond to the notification. In case the user does not respond to the notification, the mobile application automatically sends messages to a preprogrammed list of several people and/or emergency services.

DRAWINGS

Reference Numerals

10—start of the exemplary process of operation of the invention
12—detecting network signals
14—asking the user whether there are one or more occupants in the vehicle
16—the user responds that there are no occupants in the vehicle
18—the user responds that there are one or more occupants in the vehicle
20—when the network signals are no longer available, the invention sends a notification to the user requesting him/her to respond to the notification
22—the user responds to the notification
24—the user does not respond to the notification
26—sending alerts to a preprogrammed list of several people and/or emergency services
28—end of the exemplary process of operation of the invention
30—exemplary user interface display including an exemplary notification asking the user whether there are one or more occupants in the vehicle
32—exemplary user interface display including an exemplary notification asking the user to respond if there are no occupants in the vehicle
34—exemplary user interface display including an exemplary alert
35—exemplary notification asking the user whether there are one or more occupants in the vehicle
36—button "No" which appears on the exemplary notification asking the user whether there are one or more occupants in the vehicle 38—button "Yes" which appears on the exemplary notification asking the user whether there are one or more occupants in the vehicle
40—exemplary notification asking the user to respond if there are not any occupants in the vehicle
41—button "O.K." which appears on the exemplary notification asking the user to respond if there are not any occupants in the vehicle
42—exemplary alert warning that there are one or more occupants left unattended in a vehicle

DETAILED DESCRIPTION OF THE INVENTION

Figure 1:
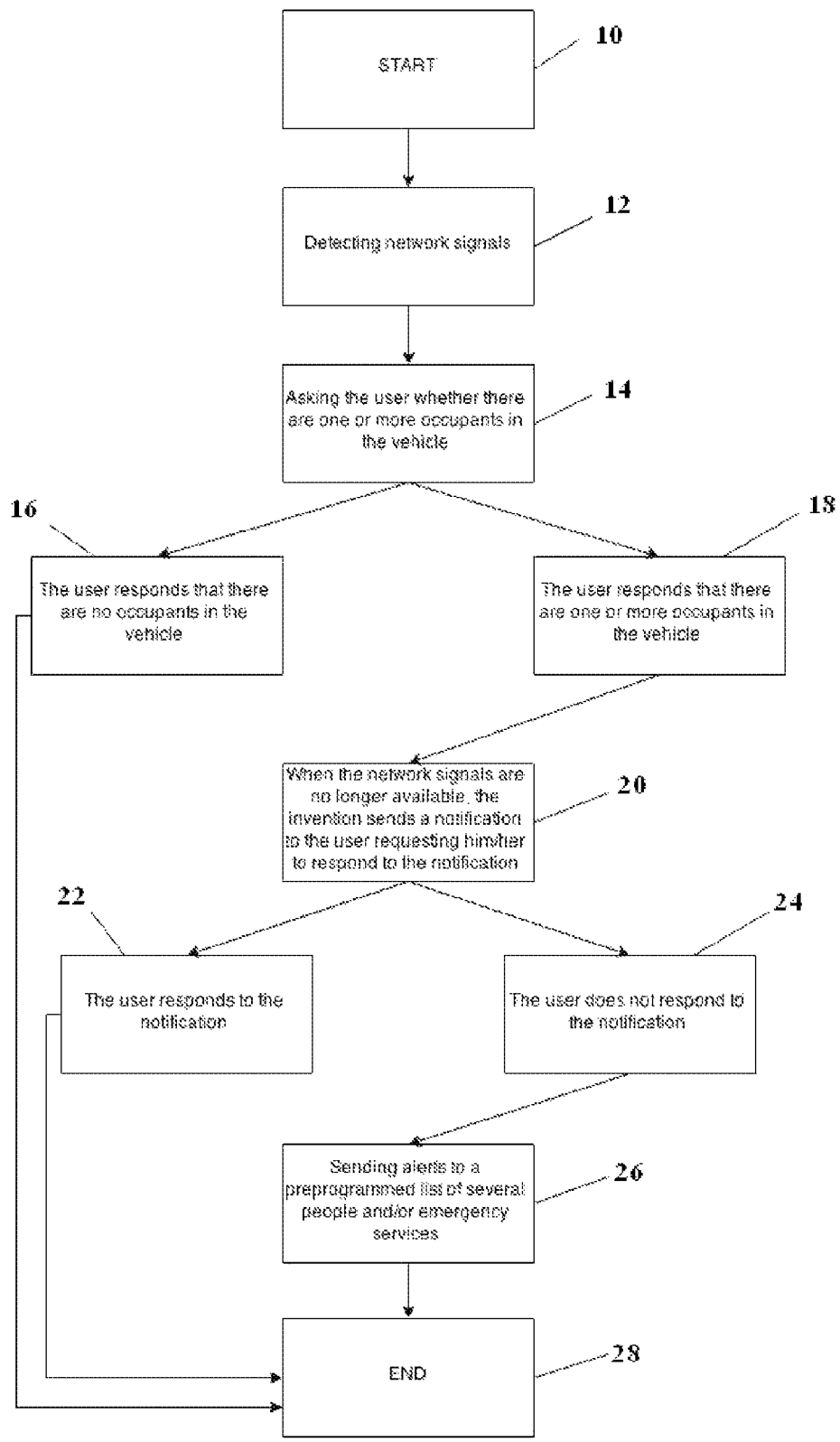
FIG. 1 is a flowchart of an exemplary process of operation of the invention

Referring now to the invention in more detail, in FIG. 1 there is shown a flow chart of an exemplary process of operation of the invention consisting of the following steps: start of the exemplary process of operation of the invention 10; detecting network signals 12; asking the user whether there are one or more occupants in the vehicle 14; the user responds that there are no occupants in the vehicle 16; the user responds that there are one or more occupants in the vehicle 18; when the network signals are no longer available, the invention sends a notification to the user requesting him/her to respond to the notification 20; the user responds to the notification 22; the user does not respond to the notification 24; sending alerts to a preprogrammed list of several people and/or emergency services 26; end of the exemplary process of operation of the invention 28;

In more detail, still referring to the invention of FIG. 1, at step 12, the invention detects whether there are network signals. The network signals can be emitted, for example, by Bluetooth and/or WiFi devices built-in in the vehicle and/or an additional Bluetooth and/or an additional WiFi device. If the invention detects network signals, step 14 would be initiated. At step 14, the invention asks the user whether there are one or more occupants in the vehicle. For example, the invention can ask the user whether there are one or more occupants in the vehicle by displaying a notification on the mobile device of the user. The notification may contain the text "Are there one or more occupants in the vehicle (except the current user of the mobile phone)?" In addition, the notification may contain two buttons, namely, "Yes" and "No." If the user responds that there are no occupants in the vehicle 16, the exemplary process of operation of the invention ends 28. If the user responds that there are one or more occupants in the vehicle 18, the invention checks for interruptions of the network signals. When the network signals are no longer available, the invention sends a notification to the user requesting him/her to respond to the notification 20. If the user responds to the notification 22, the exemplary process of operation of the invention ends 28. If the user does not respond to the notification 24, the invention automatically sends alerts to a preprogrammed list of several people and/or emergency services 26. The alerts may include sending notifications using technologies such as text and/or email and/or chat. The alerts include a message that an occupant is left in the vehicle with or without location information of the vehicle in which the occupant is left. The location information is obtained either from location services and/or devices such as GPS, satellite, cellular, or other devices built-in in the vehicle and/or mobile device and/or additional location devices. In one embodiment of the invention, the invention not only sends notifications to a preprogrammed list of several people and/or emergency services 26, but also plays a sound. In another embodiment of the invention, the alerts sent by the invention may include information that can be used for locating the vehicle in which the occupant is left. Such information includes, but is not limited to, information about the type of the vehicle, the color of the vehicle, the license plate of the vehicle, and the temperature outside and inside the vehicle.

Figure 2:
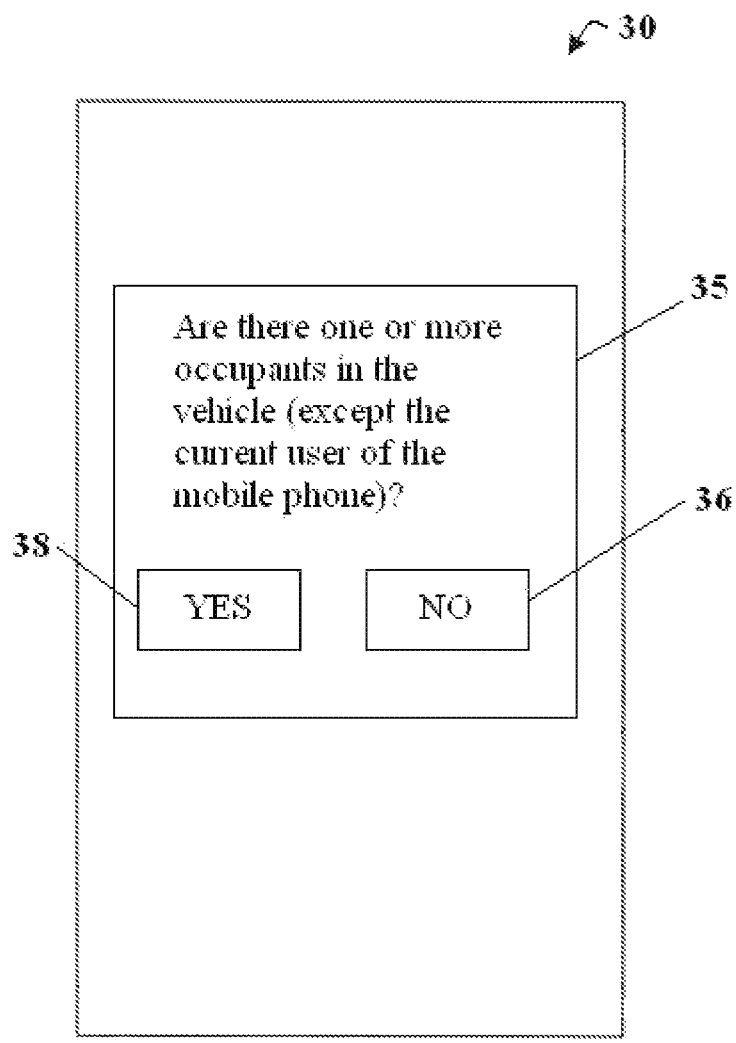
FIG. 2 is an exemplary user interface display including an exemplary notification asking the user whether there are one or more occupants in the vehicle

Referring now to the invention in more detail, in FIG. 2 there is shown an exemplary user interface display including an exemplary notification asking the user whether there are one or more occupants in the vehicle 30 which displays an exemplary notification asking the user whether there are one or more occupants in the vehicle 35, button "No" which appears on the exemplary notification asking the user whether there are one or more occupants in the vehicle 36, and button "Yes" which appears on the exemplary notification asking the user whether there are one or more occupants in the vehicle 38.

In more detail, still referring to the invention of FIG. 2, the exemplary notification asking the user whether there are one or more occupants in the vehicle 35 displays the following question "Are there one or more occupants in the vehicle (except the current user of the mobile phone)?" If the user would like to answer negatively to the aforementioned question, the user needs to press the button "No" which appears on the exemplary notification asking the user whether there are one or more occupants in the vehicle 36. If the user would like to answer positively to the question, the user needs to press the button "Yes" which appears on the exemplary notification asking the user whether there are one or more occupants in the vehicle 38.

Figure 3:
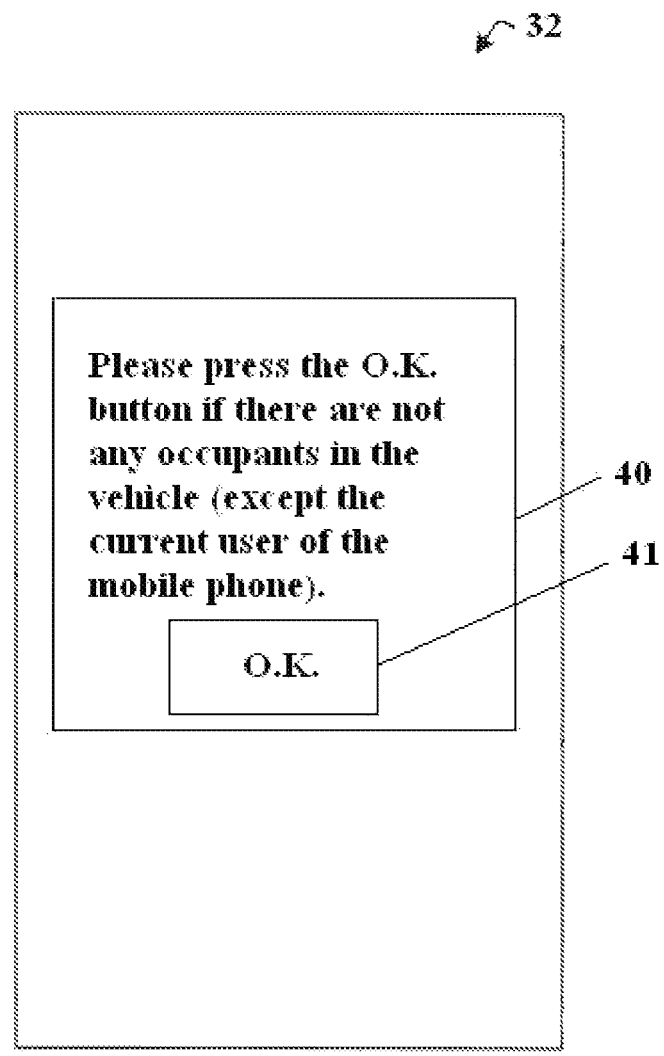
FIG. 3 is an exemplary user interface display including an exemplary notification asking the user to respond if there are no occupants in the vehicle

Referring now to the invention in more detail, in FIG. 3 there is shown an exemplary user interface display including an exemplary notification asking the user to respond if there are no occupants in the vehicle 32. The exemplary user interface display including an exemplary notification asking the user to respond if there are no occupants in the vehicle 32 displays an exemplary notification asking the user to respond if they are not any occupants in the vehicle 40 and the button "O.K." which appears on the exemplary notification asking the user to respond if there are not any occupants in the vehicle 41.

In more detail, still referring to the invention of FIG. 3, the exemplary notification asking the user to respond if they are not any occupants in the vehicle 40 displays the following exemplary message: "Please press the O.K. button if there are not any occupants in the vehicle (except the current user of the mobile phone)." If the user would like to respond to the aforementioned message, the user needs to press the button "O.K." which appears on the exemplary notification asking the user to respond if they are not any occupants in the vehicle 41.

Figure 4:
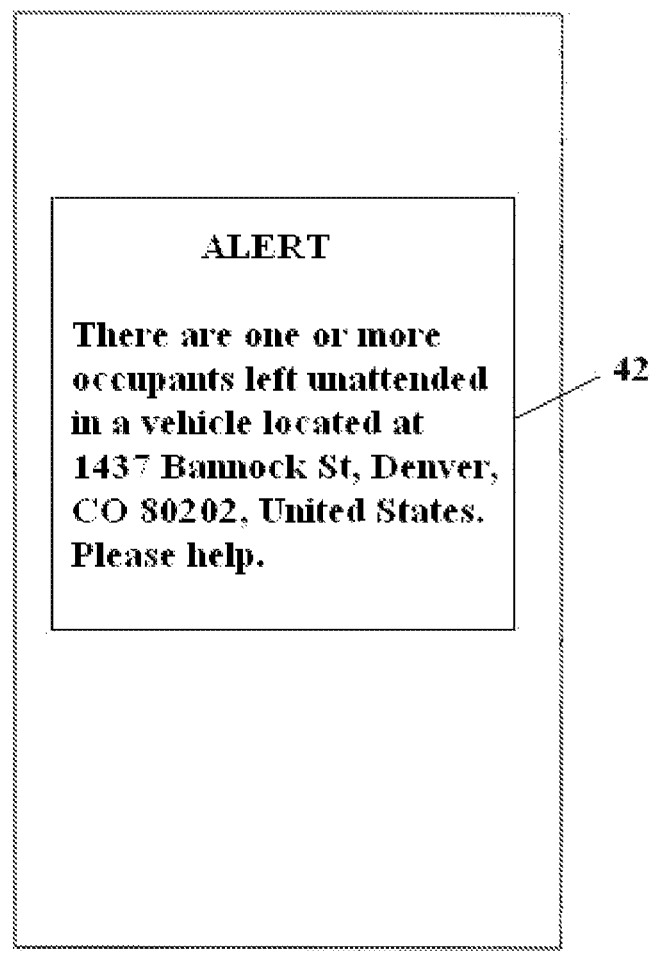
FIG. 4 is an exemplary user interface display including an exemplary alert

Referring now to the invention in more detail, in FIG. 4 there is shown an exemplary user interface display including an exemplary alert 34. The exemplary user interface display including an exemplary alert 34 displays an exemplary alert warning that there are one or more occupants left unattended in a vehicle 42.

In more detail, still referring to the invention of FIG. 4, the exemplary alert warning that there are one or more occupants left unattended in a vehicle 42 displays the following exemplary message: "There are one or more occupants left unattended in a vehicle located at 1437 Bannock St, Denver, Colo. 80202, United States. Please help."

The advantages of the present invention include, without limitation:

The invention provides the individual or individuals responsible for the occupant not only with a message that the occupant is left in a vehicle, but also with location information. This allows the individual or individuals who receive the alert to quickly find the location of the vehicle;

The invention can be provided at an affordable price or free. Since the invention can be implemented in a mobile application, the user does not need to buy a special device. In order to use the invention, one needs to install a mobile application;

The invention may help to avoid circumstances that may cause occupant's hyperthermia in a vehicle;

The invention may help to avoid circumstances that may cause occupant's hypothermia in a vehicle;

The invention may help to avoid circumstances that may cause occupant's suffocation in a vehicle;

The invention may save the life of the occupant left in a vehicle;

The invention may save the life of the occupant left in a vehicle even if the individual or individuals responsible for the occupant of that vehicle do not respond to the notifications and the alerts sent by the invention;

In case the occupant is left in the car, the invention may straightforwardly send a message to an emergency service. Thus, if the person responsible for the occupant does not receive the message for any reason, the invention will inform emergency services who can rescue the occupant;

In one embodiment of the invention, the invention is a mobile application that, after being installed and activated on a mobile device, detects whether there are network signals. The network signals can be emitted, for example, by Bluetooth and/or WiFi devices built-in in the vehicle and/or an additional Bluetooth and/or an additional WiFi device. After the invention detects network signals, the mobile application asks the user whether or not there is an occupant in the vehicle. If the user responds that there are no occupants in the vehicle, no further steps are initiated by the invention. If the user responds that there are one or more occupants in the vehicle, the invention starts checking for interruption of the network signals. When the network signals are no longer available, the invention sends a notification to the user requesting him/her to respond to the notification. If the user responds to the notification, no further steps are initiated by the invention. If the user does not respond to the notification, the invention sends alerts to a preprogrammed list of several people and/or emergency services.

The embodiment is able to be implemented, for example, using a machine-readable medium or article which is able to store an instruction or a set of instructions that, if executed by a machine, cause the machine to perform the operations described herein. Such machine is able to include, for example, any suitable processing platform, computing platform, computing device, processing device, electronic-device, electronic system, computing system, processing system, computer, processor, or the like, and is able to be implemented using any suitable combination of hardware and/or software.

The machine-readable medium or article is able to include, for example, any suitable type of memory unit, memory device, memory article, memory medium, storage device, storage article, storage medium and/or storage unit; for example, memory, removable or non-removable media, erasable or non-erasable media, write-able or re-write-able media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

The instructions are able to include any suitable type of code, for example, source code, compiled code, interpreted code, executable code, static code, dynamic code, or the like, and are able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method for notifying one or more individuals about the presence of one or more occupants in a vehicle, the method comprising:
    in a computer, detecting network signals emitted by a Bluetooth device built-in in the vehicle;
    when network signals are detected, sending a notification to a user requesting the user to respond whether there are one or more occupants in a vehicle;
    when the user responds that there are one or more occupants in the vehicle, regularly checking whether the detected network signals are still available;
    when the detected network signals are no longer available, sending a notification to the user requesting the user to respond if there are not any occupants in the vehicle; and
    when, within a certain period of time, the user does not respond to the notification requesting the user to respond if there are not any occupants in the vehicle, sending alerts to a preprogrammed list of several people.

2. The method of claim 1, wherein the network signals are emitted by a WiFi device built-in in the vehicle.

3. The method of claim 1, wherein the network signals are emitted by a Bluetooth device that is not built-in in the vehicle.

4. The method of claim 1, wherein the network signals are emitted by a Wifi device that is not built-in in the vehicle.

5. The method of claim 1 wherein the alerts are sent to a preprogrammed list of emergency services.

6. The method of claim 1 wherein the alerts are sent to a preprogrammed list of people and emergency services.

* * * * *